(12) United States Patent
Ueno et al.

(10) Patent No.: US 7,298,680 B2
(45) Date of Patent: Nov. 20, 2007

(54) OPTICAL DISC APPARATUS

(75) Inventors: Keishi Ueno, Saitama (JP); Kiyoshi Shidara, Saitama (JP)

(73) Assignee: TEAC Corporation, Musashino-shi, Tokyo (JP)

( * ) Notice: Subject to any disclaimer, the term of this patent is extended or adjusted under 35 U.S.C. 154(b) by 578 days.

(21) Appl. No.: 10/901,560

(22) Filed: Jul. 29, 2004

(65) Prior Publication Data

US 2005/0058053 A1 Mar. 17, 2005

(30) Foreign Application Priority Data

Aug. 1, 2003 (JP) ............................ P2003-285467

(51) Int. Cl.
*G11B 7/00* (2006.01)

(52) U.S. Cl. .................................. 369/47.5; 369/53.26

(58) Field of Classification Search ..................... None
See application file for complete search history.

(56) References Cited

U.S. PATENT DOCUMENTS 7,113,468 B2 * 9/2006 Udagawa .................. 369/59.11
2001/0005340 A1 * 6/2001 Nishikawa ................ 369/47.5
2002/0196719 A1 * 12/2002 Morishima ............... 369/47.53

FOREIGN PATENT DOCUMENTS

JP 2003-141767 5/2003
WO WO02/097804 * 12/2002

* cited by examiner

*Primary Examiner*—Wayne Young
*Assistant Examiner*—Lixi Chow
(74) *Attorney, Agent, or Firm*—Christensen O'Connor Johnson Kindness PLLC

(57) ABSTRACT

An optical disc apparatus provided with an automatic power control circuit which controls power of laser light by obtaining a difference between a value detected by a front monitor 6 and a target value individually for reproduction power and for recording power includes: a detector 7 for detecting light reflected from an optical disc, a sample-hold circuit 26 which performs on an output of the detector 7 a sample-hold operation at the timing of the reproduction power; and a microcomputer 29 which computes a reference value from the reflected light of the reproduction power at the timing just before the start of a recording operation after receiving a recording command until opening of a recording gate, and at the time of recording operation an intensity of reflected light on which a sample-hold operation is performed is compared with the reference value to correct a target value of the reproduction power.

2 Claims, 10 Drawing Sheets

OPTICAL DISC APPARATUS

FIELD OF THE INVENTION

The present invention relates to an optical disc apparatus which reproduces information recorded on a recording medium and also records information on the recording medium by irradiating the medium with laser light, particularly to a control of laser light power at the time of recording/reproduction.

BACKGROUND OF THE INVENTION

When a signal on an optical disc is read by irradiating laser light or when a signal is recorded on an optical disc in an optical disc apparatus, in order to stably perform a recording and reproducing operation it is important to maintain the amount of laser light at a constant level. The laser light is emitted from a laser diode in an optical pickup, and the amount of laser light is controlled by an electric current supplied to the laser diode. However, the laser diode has a characteristic that an output thereof easily fluctuates by a temperature. Therefore, in order that the laser diode stably emits a fixed amount of light, a control current is required to be increased or decreased continuously, while ceaselessly monitoring the amount of emitted laser light. In the optical disc apparatus, conventionally a photo-diode called a front monitor is provided in the vicinity of the laser diode inside the optical pickup, and APC (Automatic Power Control) is performed based on light detected by the monitor so that the power of laser light becomes a desired value.

FIG. 1 shows a circuit configuration diagram indicating a conventional APC operation. Laser light emitted form a laser diode 1 enters a beam splitter 3 after passing through a grating 2 to be polarized. The beam splitter 3 reflects the incident laser light toward an objective lens 4 and transmits a part of the light toward a front monitor 6. The reflected laser light is irradiated on a disc 5 in a condensed state through the objective lens 4. The irradiated laser light is reflected by the disc 5, and the reflected light is detected by a detector 7 after passing through the beam splitter 3. Through an RF amplifier, a reproduction signal processing circuit, various servo signal processing circuits such as for focusing and tracking signals, and the like (not shown in the drawing) are connected to the detector 7. Also, the signal detected by the front monitor 6 is input into an APC circuit 8 consisting of sample-hold circuits S/H 10, S/H 11 and differential amplifiers 12, 13, and an output from the APC circuit 8 is input into a laser drive circuit LDD 9 to control the laser light output. Then, the APC operation is further explained separately for reproduction and for recording.

When reproduction is performed, the laser diode 1 emits light with a constant reproduction power. Reproduction signal processing is performed on a reproduction signal detected by the detector 7 to reproduce information and servo signals for focusing, tracking and the like are generated. Further, the signal detected by the front monitor 6 is input into the sample-hold circuits S/H 10 and 11. At this time, the sample-hold circuit S/H 10 is made to be in a state of sampling continuously. On the other hand, the sample-hold circuit S/H 11 is in a state of OFF and a sample-hold operation is not performed. An output of the sample-hold circuit S/H 10 is input into an inverting terminal of the differential amplifier 12 to be compared with a target value 14 of reproduction power which is a fixed value. The differential amplifier circuit 12 outputs a differential signal of reproduction power to the laser drive circuit LDD 9, so that the laser output light is controlled. Thus, in the APC operation when reproduction is performed, an operation of maintaining the reproduction power at a constant level is performed to stabilize a reproduction signal quality and various servo signals (for focusing, tracking and the like).

On the other hand, at the time of recording, the laser diode 1 alternately outputs the recording power that is larger than reproduction power and the reproduction power in accordance with an EFM signal output from an encoder as shown in FIG. 2A. The sample-hold circuit S/H 10 performs sampling of a front monitor detection signal at the timing of the reproduction power and holds at the time of the recording power as shown in FIG. 2B. The output of the sample-hold circuit S/H 10 sampled at the timing of the reproduction power is input into the laser drive circuit LDD 9 after being compared with a fixed target value 14 of the reproduction power in the differential amplifier 12, and the operation of maintaining the reproduction power at a constant level is performed to stabilize the reproduction signal quality and the various servo signals (for focusing, tracking and the like). On the contrary, the sample-hold circuit S/H 11 performs sampling of the front monitor detection signal at the timing of the recording power as shown in FIG. 2C and holds at the time of the reproduction power. The output of the sample-hold circuit S/H 11 sampled at the timing of the recording power is input into the laser drive circuit LDD 9 after being compared with a fixed target value 15 of the recording power in the differential amplifier 13, and an operation of maintaining the recording power at a constant level is performed to stabilize a recording signal quality.

[Patent reference 1] Japanese Published Patent Application No. 2003-141767

In the above described APC circuit, a fluctuation of laser light is detected based on the laser light emitted from the laser diode, and a control is performed to maintain the laser power at a constant level. However, when recording and reproduction are actually performed, there is a case in which an amount of light reflected from a disc varies between an inner circumference side and an outer circumference side due to a warp of the disc. In addition, there is a case in which a reflectance varies on the same disc depending on a position due to uneven coating of a recording material when manufacturing the disc. Further, the reflectance also locally changes due to a defect such as a finger print or a scratch on the disc. Due to the above, even if the laser power is maintained at a constant level by the above described APC circuit, the same reproduction signal level and servo signal level cannot be obtained continuously because of the fluctuation of light amount detected by the detector.

Furthermore, the APC operation on recording carries out the control while performing the sample-hold of two kinds of power, that is, of the recording power for stabilizing a recording quality and the reproduction power for stabilizing various servo signals, as described above; however, since the APC of the reproduction power controls much minute power compared with the APC of the recording power, such influence as a pulse light emission waveform of the laser diode, a pulse response (settling) of the front monitor, an offset of the sample-hold circuit and the like cannot be neglected. FIG. 2D shows an output waveform of the front monitor at this time. The higher a recording speed is, the more those errors occur, and a shift of the bottom power occurs, which greatly affects the various servo controls. In the above, the recording in a write-once type disc is referred to as an example; however there exists a similar problem in a case of recording on a rewritable type disc such as a phase change disc, though the APC operation is performed by carrying out the sample-hold of erasing power instead of the reproduction power.

SUMMARY OF THE INVENTION

An aspect of claim 1 of the present invention is an optical disc apparatus provided with a laser diode to irradiate an optical disc with laser light, a drive circuit which drives the laser diode with a first power having a recording level in accordance with recording data and also drives the laser diode with a second power having a lower level than the above recording level during a period between one recording data and another recording data, a front monitor which monitors an emitted light amount of the laser light, and an automatic power control circuit which controls the power of laser light by obtaining a difference between the above second power detected by the front monitor and a target value; including: an optical detector for detecting a reflected light amount of the irradiated laser light from the optical disc, a unit for taking in the reflected light amount output from the optical detector, a unit for obtaining a reference value from the reflected light amount output from the optical detector which is taken in immediately before a start of a recording operation after receiving a recording command until opening of a recording gate, a comparison unit for comparing the reflected light amount output from the optical detector after the start of the recording operation with the reference value, and a unit for correcting the target value of the above second power in accordance with the result of comparison by the comparison unit, wherein the target value of the reproduction power of the APC circuit can be changed dynamically in accordance with a fluctuation of the reflected light amount.

An aspect of claim 2 of the present invention is an optical disc apparatus provided with a laser diode to irradiate an optical disc with laser light, a drive circuit which drives the laser diode to emit laser light with reproduction power, a front monitor which monitors an emitted light amount of the above laser light and an automatic power control circuit which controls the power of laser light by obtaining a difference between the amount of light detected by the front monitor and a target value; including: an optical detector for detecting a reflected light amount of the irradiated laser light from the optical disc, a unit for taking in a reflected light amount output from the optical detector, a unit for obtaining a reference value from the reflected light amount output from the optical detector which has been taken in during a predetermined period of time after a start of a reproduction operation, a comparison unit for comparing the reflected light amount output from the optical detector with the reference value after the predetermined period has passed, and a unit for correcting the target value of the above reproduction power in accordance with the result of comparison by the comparison unit, wherein the target value of the reproduction power in the APC circuit can be changed dynamically in accordance with a fluctuation of the reflected light amount of the reproduction power.

According to the aspect of claim 1 of the present invention, since the reference value is obtained from the reflected light amount that is output immediately before the start of the recording operation, an ideal reflected light amount level from an actual disc at the time of recording can be instantaneously be learned in advance, and therefore the reflected light amount output from the optical detector after the start of recording operation is compared with the reference value to change the target value of the APC circuit, so that the fluctuation of the reflected light amount and errors of a laser light emission waveform, a pulse response of the front monitor, an offset of the sample hold and the like are automatically corrected to stably obtain a servo signal continuously and the stable recording operation can be realized.

Further, according to the aspect of claim 2 of the present invention, since the reference value is obtained from the reflected light amount output from the optical detector which has been taken in during the predetermined period of time after the start of the reproduction operation, an ideal reflected light amount level from an actual disc at the time of reproduction can be learned instantaneously, and therefore the reflected light amount output from the optical detector after the predetermined period has passed is compared with the reference value to change the target value of the reproduction power of the APC circuit, so that the fluctuation of the reflected light amount is automatically corrected to stably obtain a servo signal continuously without performing an additional servo adjustment and the stable reproduction operation can be realized.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DESCRIPTION OF THE PREFERRED EMBODIMENTS

Figure 1:
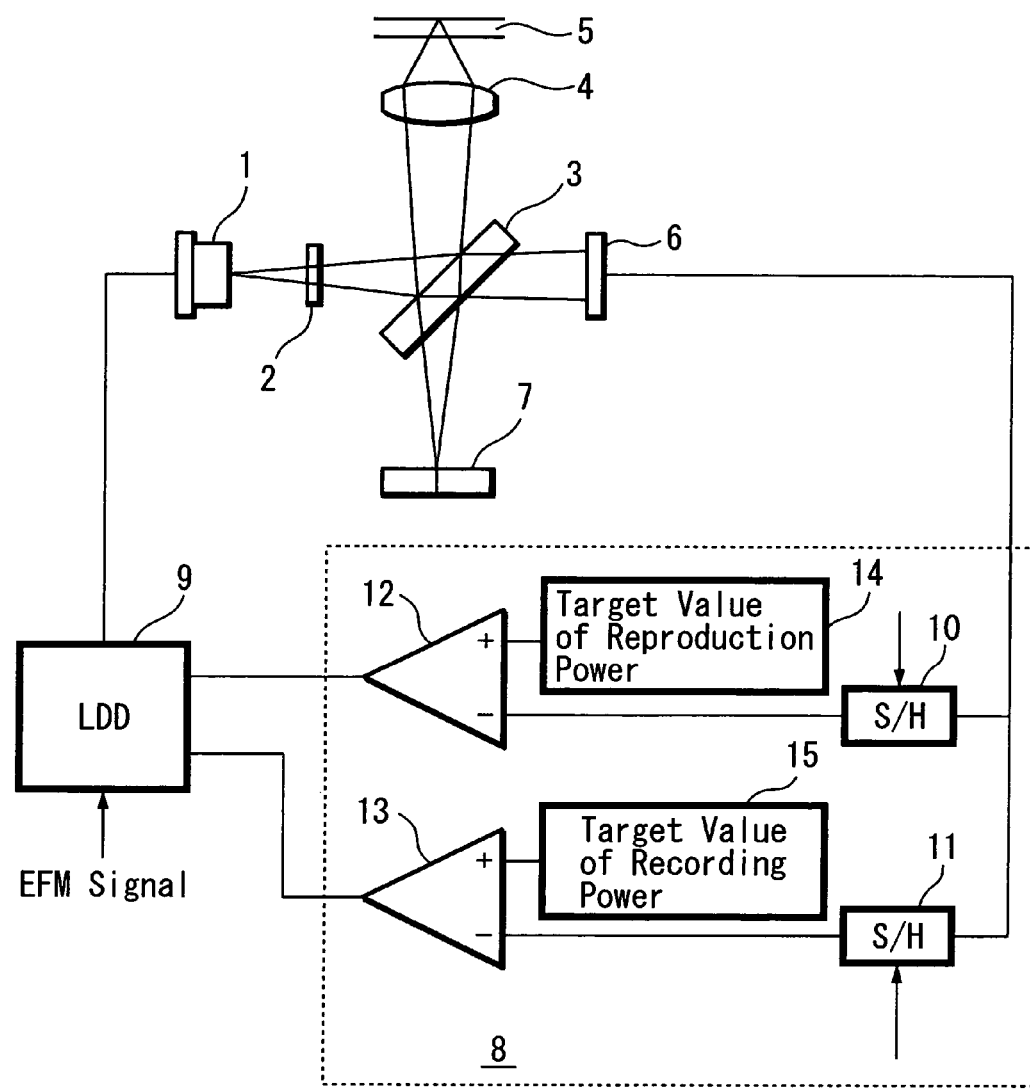
FIG. 1 is a circuit configuration diagram of a conventional APC operation.
Figure 2A:
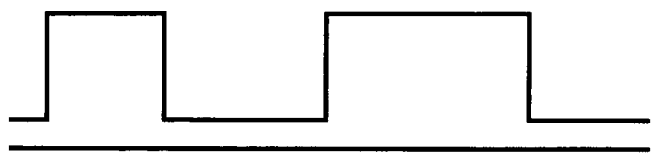
FIGS. 2A to 2D are time charts of conventional APC operations.
Figure 2B:
Figure 2C:
Figure 2D:
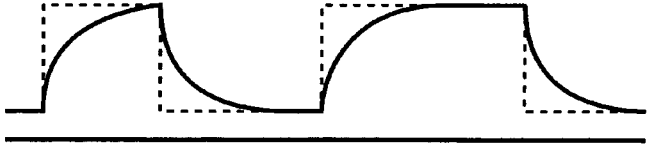
Figure 3:
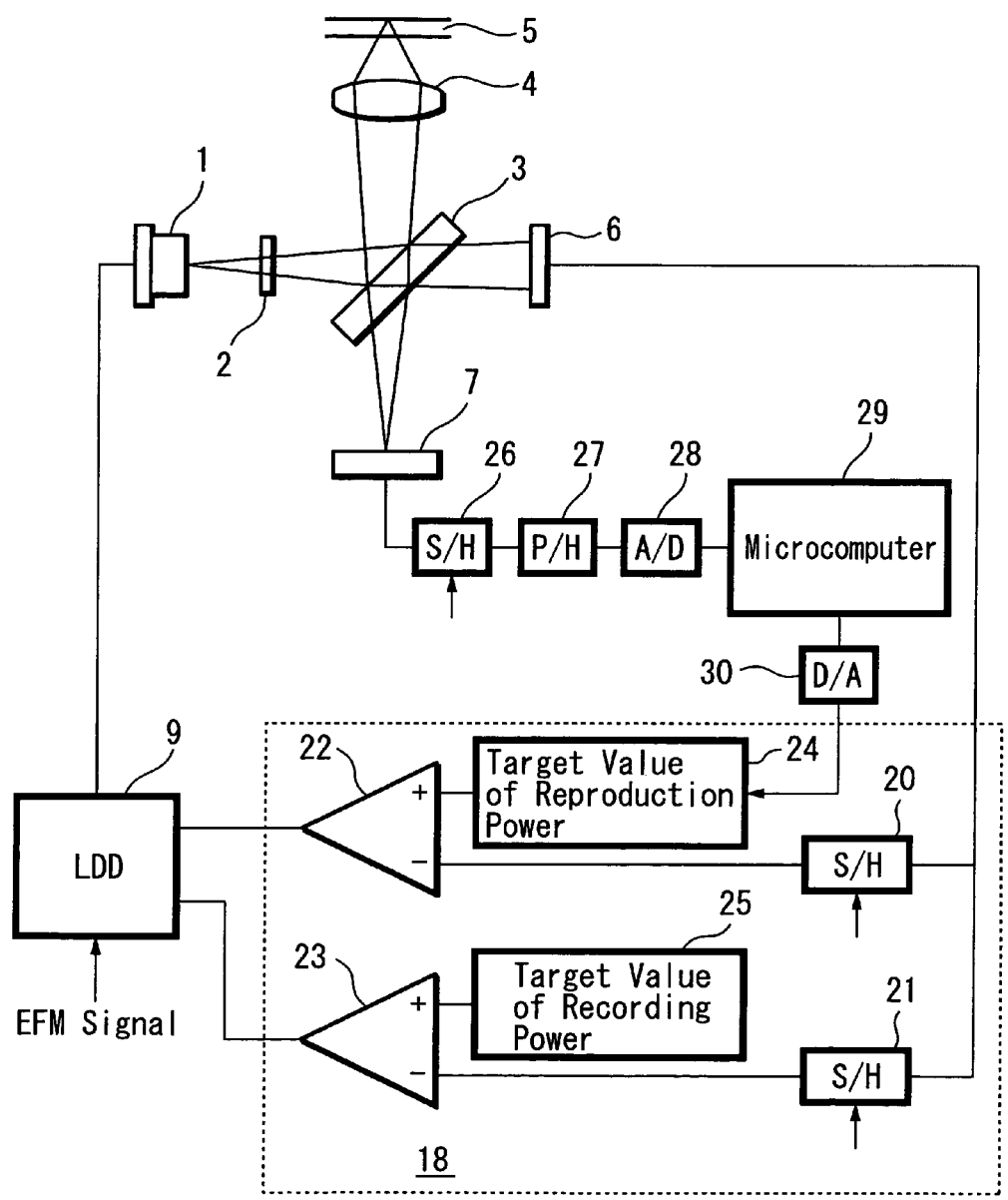
FIG. 3 is a circuit configuration diagram of an APC operation in the case where the present invention is applied to a write-once type disc.

FIG. 3 shows a circuit configuration diagram of an APC operation in the case where the present invention is applied to a write-once type disc. Hereupon, the same reference numerals are given to portions which have equivalent functions to those in the above described FIG. 1 and explanations thereof are omitted. A difference between FIG. 1 and FIG. 3 is that a function for correcting a target value of reproduction power is provided in FIG. 3. In FIG. 3, a sample-hold circuit S/H 26 which is connected to the detector 7, a peak hold circuit P/H 27, an A/D converter circuit 28, a microcomputer 29 and a D/A converter circuit 30 constitute the above function and perform an operation of correcting the target value of the reproduction power.

Figure 4:
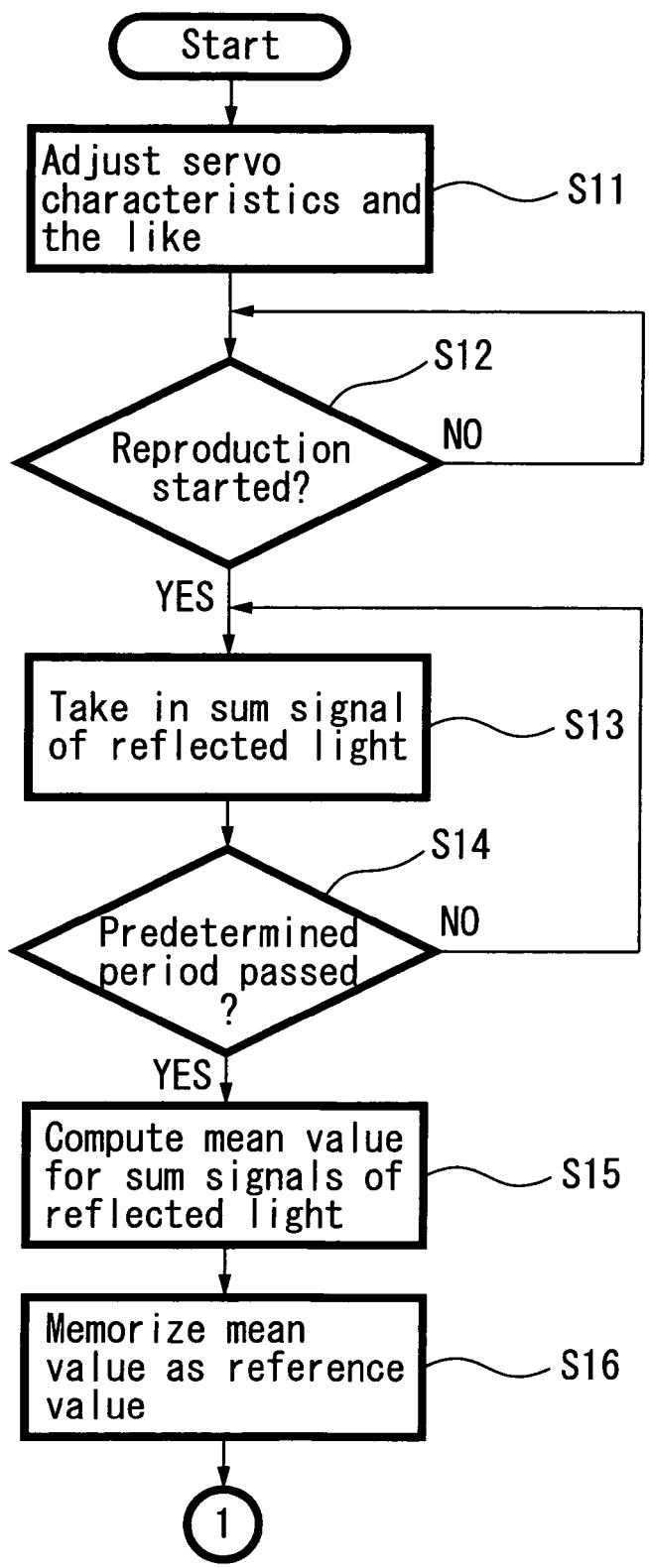
FIG. 4 is a flow chart showing an operation of setting a reference value for correcting a target value of reproduction power at the time of reproduction.

Next, the APC operation of the present invention at the time of reproduction will be explained. First, an operation of setting a reference value for correcting the target value of the reproduction power is explained referring to FIG. 4. At the beginning, when power is turned on or a disc is loaded and the like, an offset adjustment of focusing and tracking, an adjustment of servo characteristics of an optical pickup including a gain adjustment and a balance adjustment, and an equalizer adjustment of an RF amplifier are performed prior to a start of the reproduction operation (S11). The target value of the reproduction power at this time is set as an initial value, and a signal detected by the front monitor 6 is input into a sample-hold circuit S/H 20. At this time, the sample-hold circuit S/H 20 is made to be in a state of sampling continuously. An output of the sample-hold circuit S/H 20 is input into a differential amplifier circuit 22 to be compared with a target value 24 which is set as the initial value of the reproduction power. An output signal from the differential amplifier circuit 22 is sent to the laser drive circuit 9, and a light amount emitted from the laser is controlled to be constant by an output signal from the laser drive circuit 9. When the reproduction is started after completing the adjustment operation of the servo characteristics and the like, the microcomputer 29 starts the operation of setting the reference value for the target value of the reproduction power (S12). A sum signal of light reflected from the disc which is detected by each divided plane of the quarter division detector 7 is taken into the microcomputer 29 through the sample-hold circuit S/H 26, the peak hold circuit P/H 27 and the A/D converter circuit 28 (S13). Hereupon, the sample-hold circuit S/H 26 is made to be in the state of sampling continuously, and the peak hold circuit P/H 27 eliminates a pit component in the sum signal of the reflected light. When a predetermined period of time is passed after the start of the reproduction operation, the microcomputer 29 computes a mean value for the sum signals of the reflected light which have been taken in during the period (S14, S15). The above predetermined period is set to be a time longer than the period described later on for computing the mean value for the sum signals of the reflected light in order to correct the target value of the reproduction power. The computed mean value is stored in the microcomputer 29 to be the reference value as an optimal sum signal of the reflected light which corresponds to the adjusted value of the servo characteristics and the like for correcting the target value of the reproduction power (S16).

Figure 5:
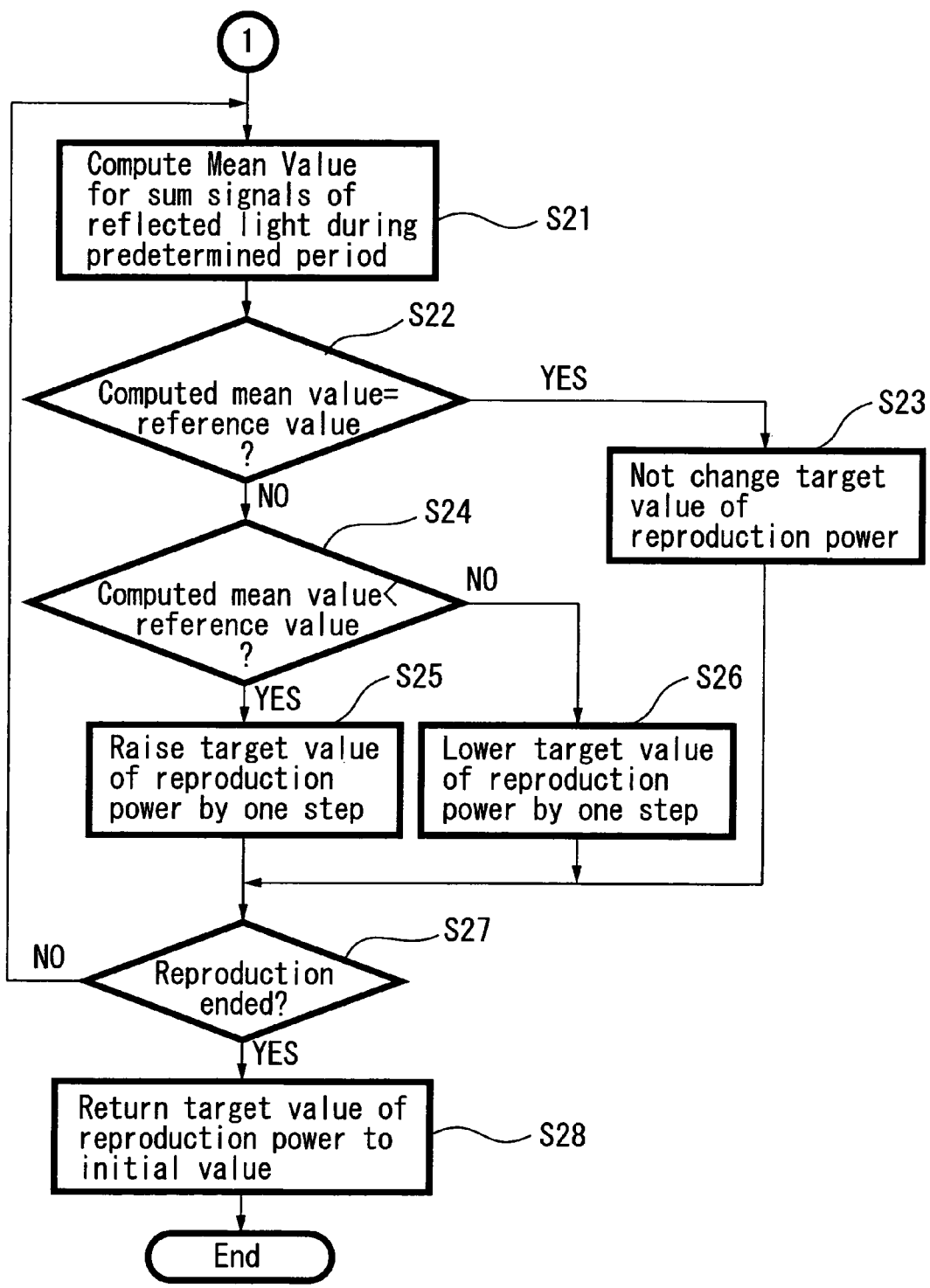
FIG. 5 is a flow chart showing an operation of correcting the target value of the reproduction power at the time of reproduction.

When the reference value is set after computing the mean value for the sum signals of the reflected light during the predetermined period, the sum signal of the reflected light which is successively taken into the microcomputer 29 is used for a comparison with the reference value, and the target value of the reproduction power is dynamically changed based on the reference value and the sum signal of the reflected light. The sequence is explained referring to FIG. 5. After the reference value is set, a mean value for every predetermined period of time which is different from the period of obtaining the mean value for setting the reference value is computed from the sum signals of the reflected light taken into the microcomputer 29 (S21).

The computed mean value for the sum signals of the reflected light is compared one after another with the reference value (S22, S24). Here, when the mean value for the sum signals of the reflected light is the same as the reference value, the target value of the reproduction power is maintained as it is (S23). As a result of comparison, when the mean value for the sum signals of the reflected light is smaller than the reference value, the target value of the reproduction power is raised by one step (S25). On the contrary, as the result of comparison, when the sum signal of the reflected light is larger than the reference value, the target value of the reproduction power is lowered by one step (S26). The modified target value is converted into an analog signal by the D/A converter circuit 30 to be set as a renewed target value. This control continues until the reproduction ends (S27). Therefore, the target value of the reproduction power is dynamically changed in accordance with the amount of light reflected from the disc. Accordingly, an emission power of the laser light is controlled such that the amount of light reflected from the disc can continuously be maintained at a predetermined fixed value in order that the servo stably works. When the reproduction is ended, the target value of the reproduction power is returned to the initial value (S28).

Figure 6:
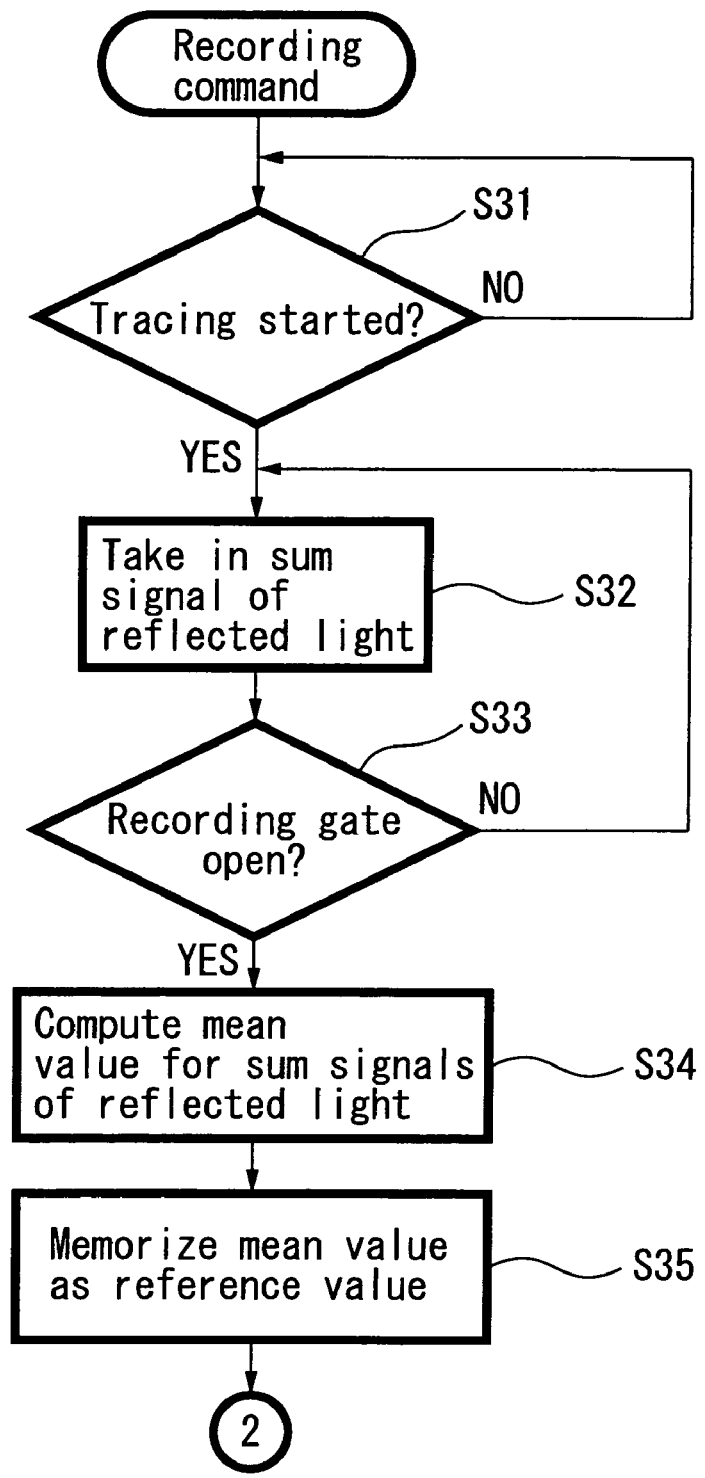
FIG. 6 is a flow chart showing an operation of setting a reference value for correcting a target value of reproduction power at the time of recording.

Next, an APC operation at the time of recording is explained. Similarly to that on reproduction as described above, first a reference value for correcting the target value of the reproduction power is also set at the time of recording. The sequence is explained referring to FIG. 6. When a recording command is received from a host, an optical disc apparatus performs an access operation of moving an optical pickup to a recording start position on a disc indicated by the command. The optical pickup is controlled to perform a pull-in operation of a servo after moving to a nearby position before the recording start position in consideration of a period required for a stabilization of the servo and is controlled to reach the recording start position while tracing a track after the pull-in of the servo is completed; and an objective lens which is displaced by the access operation to a position distant from a light axis is returned to a position close to the light axis by performing the tracing. The optical pickup reads an address in the state of tracing. Further, when the tracing is started, the sum signal of the reflected light of the detector 7 is taken into the microcomputer 29 through the sample-hold circuit S/H 26, the peak hold circuit 27 and the A/D converter circuit 28 (S31, S32). Here, the sample-hold circuit S/H 26 is made to be in the state of sampling continuously. When the address which is read coincides with the recording start position, the recording operation is started by opening a recording gate. The microcomputer 29 computes by opening the recording gate a mean value for a plurality of sum signals of the reflected light which has been taken in until that time (S33, S34). The computed mean value is stored as a reference value for correcting the target value of the reproduction power (S35). In addition, since the above period immediately before the start of the recording is set to have a certain length as described above, it is sufficient as an extent of period for computing an optimal reference value.

Figure 7:
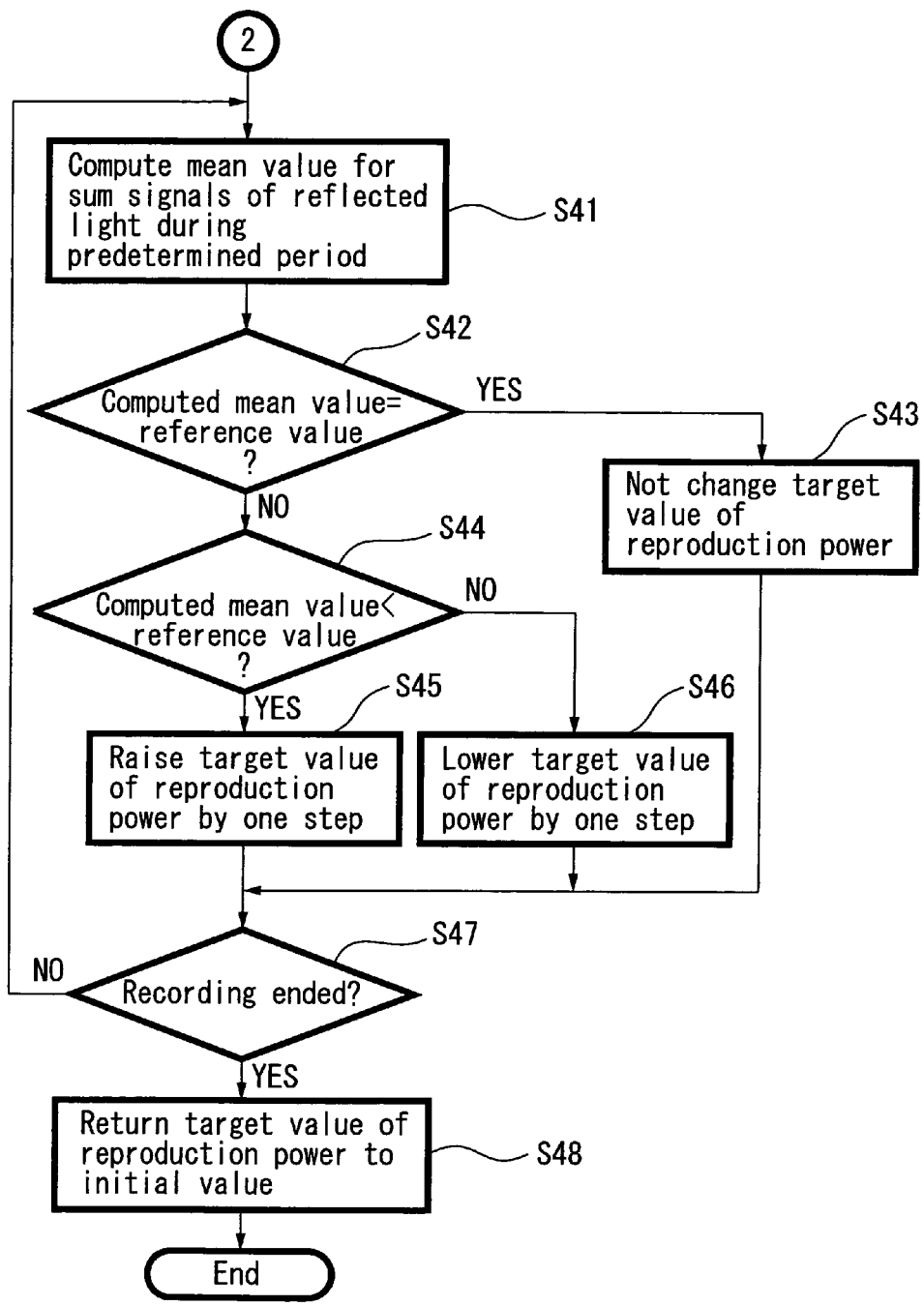
FIG. 7 is a flow chart showing an operation of correcting the target value of the reproduction power at the time of recording.

When the recording gate is open, the recording operation is started, and the recording power which is larger than the reproduction power and the reproduction power are alternately output from the laser diode 1 in accordance with the EFM signal which is output from the encoder. A sample-hold operation is performed on the output of the front monitor 6 by the sample-hold circuits S/H 21 and S/H 20 respectively at two sets of timing, that is, when a pit is generated and when a pit is not generated, and the emission power of the laser light is controlled to bring the recording power and the reproduction power close to the target values, respectively. During the period, the microcomputer 29 dynamically changes the target value of the reproduction power based on the sum signal of the reflected light which is taken in after the start of the recording operation and the reference value. The sequence is explained referring to FIG. 7. When the recording operation is started, the sample-hold operation is performed on the sum signal of the reflected light at the timing of the reproduction power by the sample-hold circuit S/H 26 and the sum signal is taken into the microcomputer 29 through the peak hold circuit 27 and the A/D converter circuit 28. The microcomputer 29 computes a mean value of every predetermined period of time for the plurality of sum signals of the reflected light which has been taken in (S41). The sum signal of the reflected light, to which the mean value is computed, is compared one after another with the previously obtained reference value (S42, S44). Hereupon, when the mean value for the sum signals of the reflected light is the same as the reference value, the target value of the reproduction power is maintained as it is (S43). As a result of comparison, when the computed sum signal of the reflected light is smaller than the reference value, the target value of the reproduction power is raised by one step (S45). On the contrary, as the result of comparison, when the sum signal of the reflected light is larger than the reference value, the target value of the reproduction power is lowered by one step (S46). The modified target value is converted to an analog signal by the D/A converter circuit 30 to be set as a renewed target value. This control continues until the recording is ended (S47). Therefore, the target value of the reproduction power is dynamically changed in accordance with the amount of light reflected from the disc. Accordingly, the emission power of the laser light is controlled such that the amount of light reflected from the disc can be maintained at a predetermined fixed value in order that the servo works stably. After the recording ends, the target value of the reproduction power is returned to the initial value before recording (S48).

Figure 8:
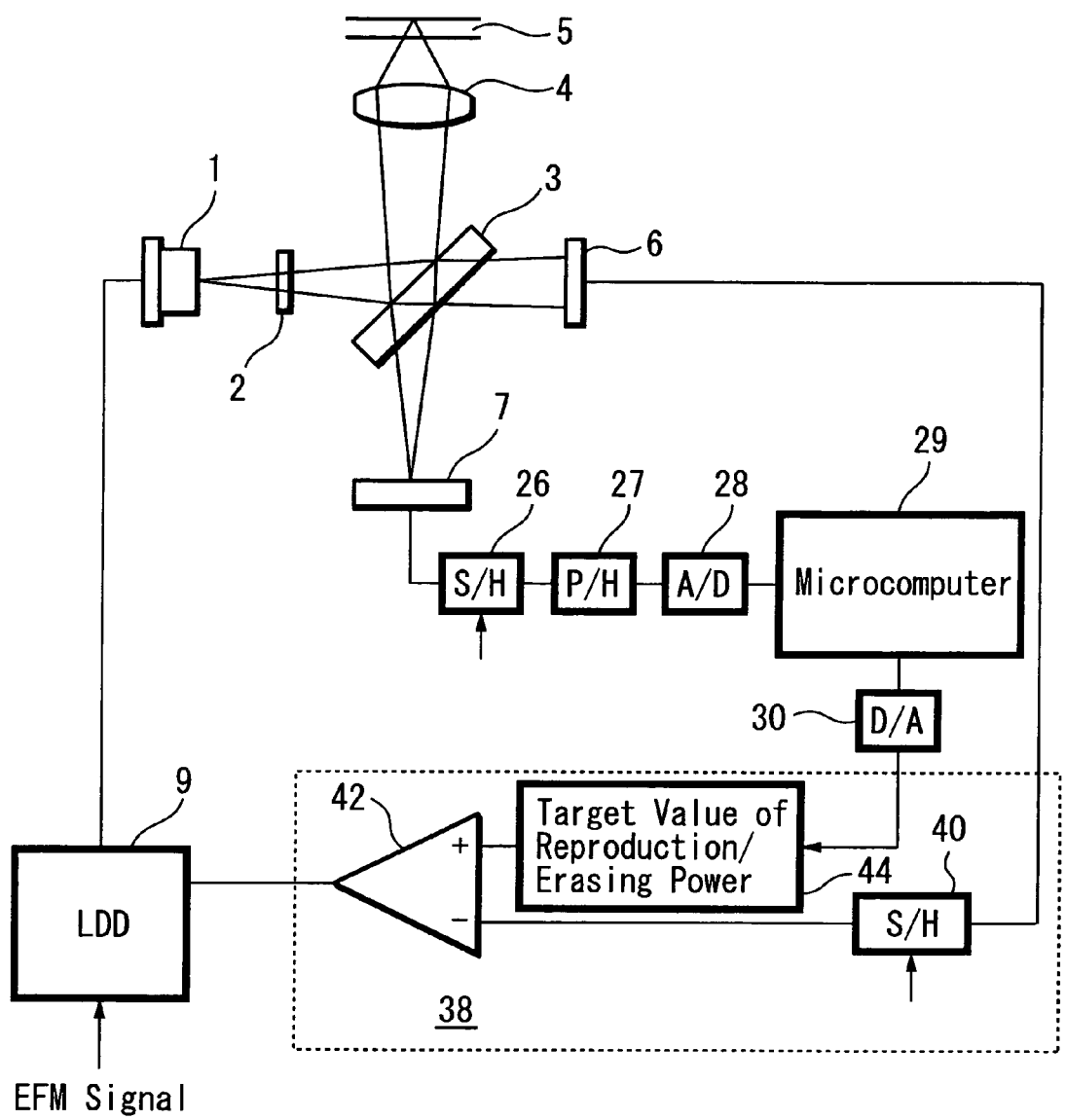
FIG. 8 is a circuit configuration diagram of an APC operation in the case where the present invention is applied to a phase change type disc.

Next, an explanation is made with respect to an example when the present invention is applied to a phase change type disc. A circuit configuration diagram of an APC operation is shown in FIG. 8. Hereupon, the configuration is the same as that of FIG. 3 except that a target value input into a non-inverting terminal of a differential amplifier 42 is made to be reproduction/erasing power and that a sampling circuit for sampling front monitor light of recording power and a differential amplifier for comparing with a target value of recording power are not provided. Since an APC operation at the time of reproduction is similar to the above described operation, an explanation thereof is omitted and an explanation is made with respect only to an APC operation at the time of recording.

Figure 9:
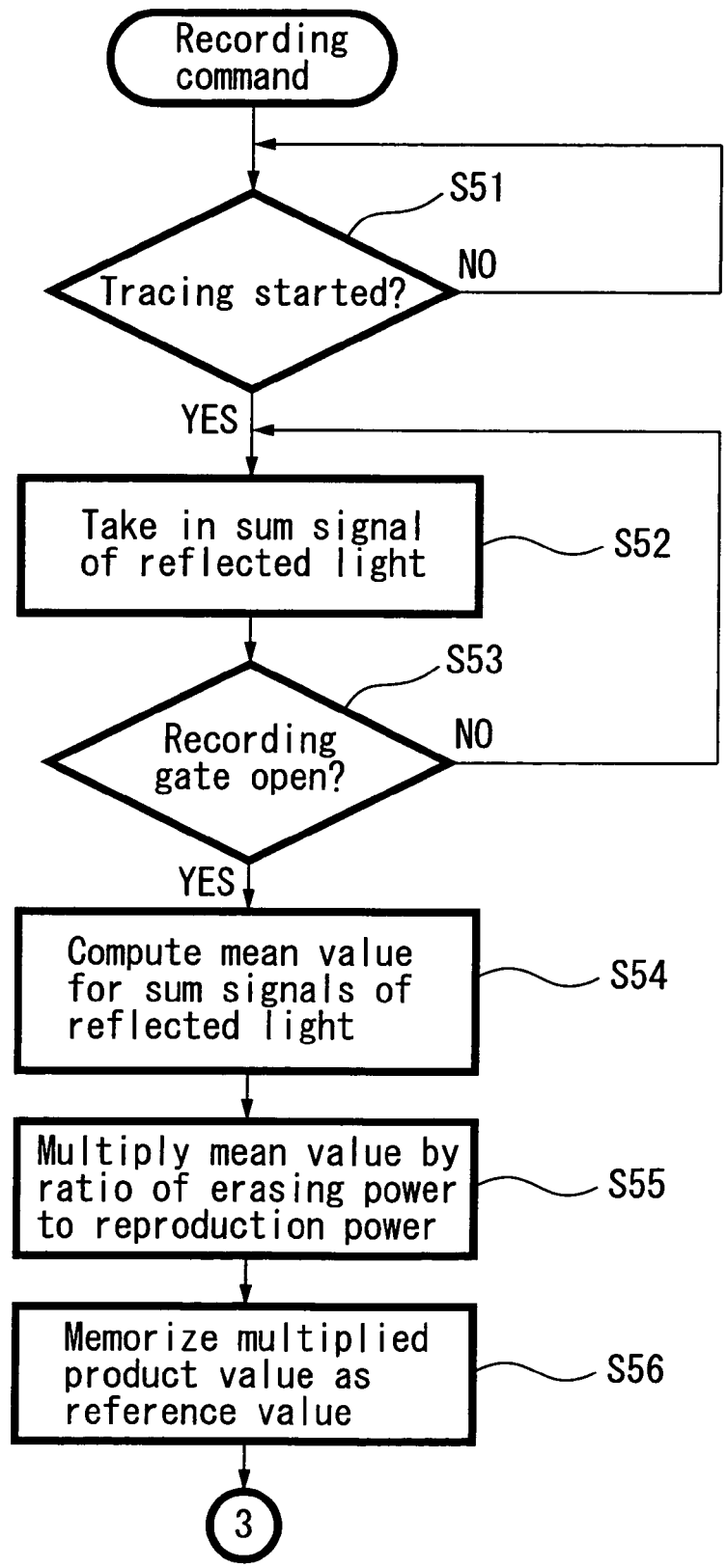
FIG. 9 is a flow chart showing an operation of setting a reference value for correcting a target value of erasing power at the time of recording.

When the recording is performed on the phase change type disc, recording power for forming a marked portion on a disc and erasing power for forming a non-marked portion are output from a laser diode in accordance with an EFM signal which is output from an encoder. First, a reference value for correcting a target value of the erasing power is set at the time of recording. The sequence is explained referring to FIG. 9. When a recording command is received from a host, an optical disc apparatus moves an optical pickup to a nearby position before a recording start position on the disc indicated by the command and starts tracing. At this time, a target value 44 of the APC circuit has been set to a target value of the reproduction power and laser light having a fixed reproduction power has been output from the laser diode. When the tracing is started, the sum signal of the reflected light of the detector 7 is taken into the microcomputer 29 through the sample-hold circuit S/H 26, the peak hold circuit P/H 27 and the A/D converter circuit 28 (S51, S52) and when a recording gate is open, the microcomputer 29 computes a mean value for a plurality of sum signals of the reflected light which has been taken in until that time (S53, S54). After being multiplied by a ratio of the erasing power to the reproduction power (S55), the computed mean value is stored in the microcomputer 29 as the reference value for correcting the target value of the erasing power (S56).

Figure 10:
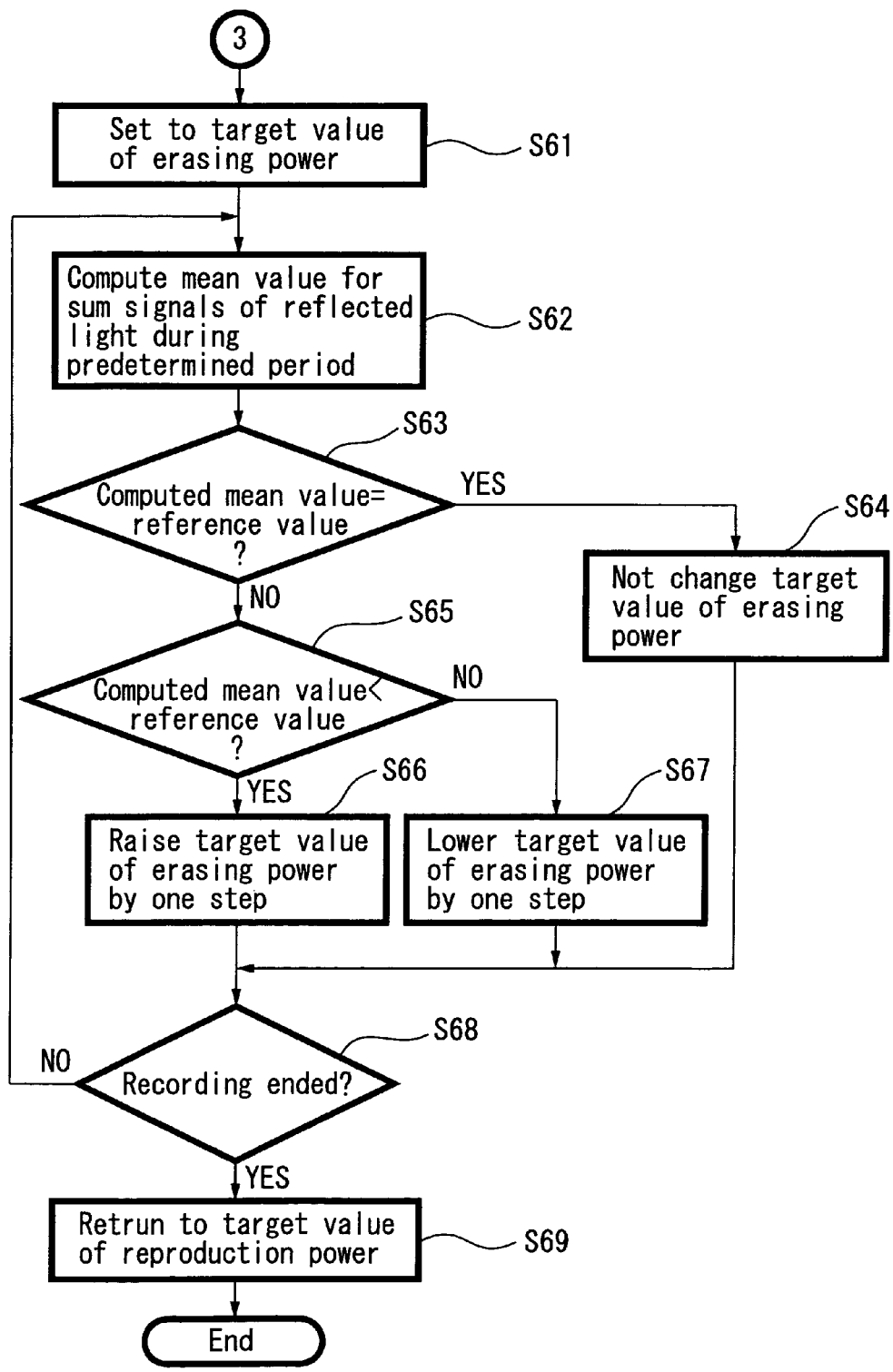
FIG. 10 is a flow chart showing an operation of correcting the target value of the erasing power at the time of recording.

When the recording gate is open, the recording operation is started. At this time, the target value 44 is set to an initial target value of the recording power from the target value of the reproduction power. The erasing power and the recording power are output from the laser diode 1 in accordance with the EFM signal output from the encoder. A sample-hold operation is performed on the output of the front monitor 6 by a sample-hold circuit S/H 40 only at the timing of not generating marking, and the emission power of the laser light is controlled to bring the erasing power and the recording power close to the target values. The microcomputer 29 compares the sum signal of the reflected light after opening the recording gate with the reference value to dynamically change the target value of the erasing power. The sequence is explained referring to FIG. 10. After setting the target value to the initial target value of the recording power from the target value of the reproduction power (S61), the microcomputer 29 computes a mean value for a plurality of sum signals of the reflected light which has been taken in at every predetermined period (S62). The sum signal of the reflected light, to which the mean value is computed, is compared one after another with the reference value which is previously obtained (S63, S65). Hereupon, when the mean value for the sum signals of the reflected light is the same as the reference value, the target value of the erasing power is maintained as it is (S64). As a result of comparison, when the computed sum signal of the reflected light is smaller than the reference value, the target value of the erasing power is raised by one step (S66). On the contrary, as the result of comparison, when the sum signal of the reflected light is larger than the reference value, the target value of the erasing power is lowered by one step (S67). The modified target value is set as a renewed target value through the D/A converter circuit 30. This control continues until the recording is ended (S67). Therefore, the target value of the erasing power is dynamically changed in accordance with an amount of light reflected from a disc. Accordingly, the emission power of the laser light is controlled such that the amount of light reflected from the disc can be always maintained at a predetermined fixed value in order that the servo works stably. After the recording is ended, the target value is returned to the target value of the reproduction power before recording (S69).

In the above described embodiments, the mean value for correcting the target value of the reproduction or erasing power is computed at every predetermined period with respect to a plurality of sum signals of reflected light within the period; however, a predetermined period and the next predetermined period may partially overlap. Further, when there is a value extremely different from neighboring sum signals of the reflected light among the sum signals of the reflected light during a period, the mean value may be computed based on the other sum signals of the reflected light than that sum signal of the reflected light. Moreover, when the mean value during a period has a value extremely different from neighboring mean values, either this value may be corrected to coincide with the neighboring mean values or a predetermined correction value may be added or subtracted. In this case, a predetermined threshold value may be set in advance such that correction processing can be performed when exceeding this value. With such settings, the emission power of the laser light can be prevented from being disturbed excessively by noise or minute defects on a disc. Further, an extent in which the emission power of the laser light follows the change of the reflected light due to the defect or the like can be adjusted by adjusting the timing of the sample-hold operation or the period for computing the mean value.

Furthermore, although the reference value is learned from the reflected light in the embodiments described above, it is also possible to make this value fixed. In this case, the fixed value is made to be an ideal sum signal level of the reflected light, for example, a sum signal level of the reflected light in which a servo signal level becomes a center value.

In addition, although the correction of the target value of the reproduction or erasing power is performed based on the computation by the microcomputer in the embodiments described above, the correction may be performed only by hardware.

According to the present invention, a stable servo signal is continuously obtained and a stable recording operation is attained, regardless of a fluctuation of a reflected light amount due to a warp of a disc or the like or errors of a laser light emission waveform, a pulse response of a front monitor, an offset of a sample hold and the like.

The present invention is applicable to an apparatus which performs reproduction and recording of information using laser light on disc such as a CD, a DVD, a blue laser disc of the next generation and the like.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

The embodiments of the invention in which an exclusive property or privilege is claimed are defined as follows:

1. An optical disc apparatus provided with a laser diode to irradiate an optical disc with laser light, a drive circuit which drives said laser diode in accordance with recording data with a first power having a recording level and drives said laser diode with a second power having a lower level than said recording level during a period between one recording data and another recording data, a front monitor which monitors an emitted light amount of said laser light, and an automatic power control circuit which controls power of the laser light by obtaining a difference between said second power detected by said front monitor and a target value of the second power, comprising:
   an optical detector which detects a reflected light amount of the irradiated laser light from the optical disc;
   a unit for taking in a reflected light amount output from the optical detector;
   a unit for obtaining a reference value from a reflected light amount output from the optical detector which has been taken in immediately before a start of a recording operation after receiving a recording command until opening of a recording gate;
   a comparison unit for comparing a reflected light amount output of the laser light with said second power from the optical detector after the start of the recording operation with the reference value; and
   a unit for correcting the target value of said second power in accordance with the result of comparison by the comparison unit.

2. An optical disc apparatus provided with a laser diode to irradiate an optical disc with laser light, a drive circuit which drives said laser diode to emit the laser light with reproduction power, a front monitor which monitors an emitted light amount of said laser light, and an automatic power control circuit which controls power of the laser light by obtaining a difference between an amount of light detected by said front monitor and a target value of said reproduction power, comprising;
   an optical detector which detects a reflected light amount of the irradiated laser light from the optical disc;
   a unit for taking in a reflected light amount output from the optical detector;
   a unit for obtaining a reference value from a reflected light amount output from the optical detector which has been taken in during a predetermined period after a start of a reproduction operation;
   a comparison unit for comparing a reflected light amount output from the optical detector during said reproduction operation after the predetermined period has passed with the reference value; and
   a unit for correcting the target value of said reproduction power during said reproduction operation in accordance with the result of comparison by the comparison unit.

* * * * *

UNITED STATES PATENT AND TRADEMARK OFFICE
CERTIFICATE OF CORRECTION

PATENT NO. : 7,298,680 B2  Page 1 of 1
APPLICATION NO. : 10/901560
DATED : November 20, 2007
INVENTOR(S) : K. Ueno et al.

It is certified that error appears in the above-identified patent and that said Letters Patent is hereby corrected as shown below:

| COLUMN | LINE | ERROR |
|---|---|---|
| 10 (Claim 1, | 12 line 19) | "rccording" should read --recording-- |
| 10 (Claim 2, | 30 line 9) | "comprising;" should read --comprising:-- |

Signed and Sealed this

Seventeenth Day of June, 2008

JON W. DUDAS
*Director of the United States Patent and Trademark Office*